(12) United States Patent
Marion et al.

(10) Patent No.: US 10,114,932 B2
(45) Date of Patent: Oct. 30, 2018

(54) ADAPTING A MOBILE APPLICATION TO A PARTITIONED ENVIRONMENT

(71) Applicant: MOBILE IRON, INC., Mountain View, CA (US)

(72) Inventors: Eric M. Marion, San Francisco, CA (US); Nitin Sonawane, Littleton, MA (US)

(73) Assignee: MOBILE IRON, INC., Mountain View, CA (US)

( * ) Notice: Subject to any disclaimer, the term of this patent is extended or adjusted under 35 U.S.C. 154(b) by 49 days.

(21) Appl. No.: 15/221,066

(22) Filed: Jul. 27, 2016

(65) Prior Publication Data

US 2017/0011206 A1    Jan. 12, 2017

Related U.S. Application Data

(63) Continuation of application No. 13/669,082, filed on Nov. 5, 2012, now Pat. No. 9,430,641.

(60) Provisional application No. 61/555,183, filed on Nov. 3, 2011.

(51) Int. Cl.
*G06F 12/12* (2016.01)
*G06F 21/12* (2013.01)
*G06F 21/53* (2013.01)
*G06F 8/61* (2018.01)
*G06F 9/455* (2018.01)

(52) U.S. Cl.
CPC .............. *G06F 21/121* (2013.01); *G06F 8/61* (2013.01); *G06F 21/53* (2013.01); *G06F 9/45533* (2013.01); *G06F 2221/0704* (2013.01); *G06F 2221/2105* (2013.01)

(58) Field of Classification Search
None
See application file for complete search history.

(56) References Cited

U.S. PATENT DOCUMENTS

| | | | | |
|---|---|---|---|---|
| 7,693,838 B2 * | 4/2010 | Morgan | ................... | G06F 21/53 707/781 |
| 8,214,208 B2 * | 7/2012 | Mallett | ................... | G10L 15/07 704/231 |
| 8,261,342 B2 * | 9/2012 | Newman | ............... | H04L 63/126 705/64 |
| 8,601,283 B2 * | 12/2013 | Jogand-Coulomb | ... | G06F 21/10 705/50 |
| 8,649,770 B1 * | 2/2014 | Cope | ........................ | G06F 21/53 370/217 |
| 8,695,060 B2 * | 4/2014 | Wade | ....................... | G06F 21/54 726/1 |
| 2009/0319782 A1 * | 12/2009 | Lee | .......................... | G06F 21/34 713/156 |
| 2010/0024028 A1 * | 1/2010 | Baugher | ................. | G06F 21/62 726/17 |

(Continued)

*Primary Examiner* — Lynn D Feild
*Assistant Examiner* — Richard A McCoy
(74) *Attorney, Agent, or Firm* — Van Pelt, Yi & James LLP

(57) ABSTRACT

Adapting a mobile or other application ("app") to a partitioned environment is disclosed. In various embodiments, a "secure zone" or other logical partition is created and enforced at least in part by adapting a mobile or other app to behave in a manner required by and/or otherwise associated with the secure zone or other partition and which behavior is or in various embodiments may be different than a native behavior of the mobile or other app as designed and written by an application developer of the app.

20 Claims, 19 Drawing Sheets

(56) References Cited

U.S. PATENT DOCUMENTS

| | | | | |
|---|---|---|---|---|
| 2010/0281102 A1* | 11/2010 | Chinta | ................... | G06F 21/53 |
| | | | | 709/203 |
| 2011/0173251 A1* | 7/2011 | Sandhu | .................... | G06F 8/61 |
| | | | | 709/203 |
| 2011/0225417 A1* | 9/2011 | Maharajh | ................ | G06F 21/10 |
| | | | | 713/150 |
| 2011/0230211 A1* | 9/2011 | Kim | ....................... | G06F 21/71 |
| | | | | 455/456.4 |
| 2011/0314534 A1* | 12/2011 | James | .................... | G06F 21/53 |
| | | | | 726/9 |
| 2012/0108205 A1* | 5/2012 | Schell | ................ | H04L 63/0823 |
| | | | | 455/411 |
| 2012/0246731 A1* | 9/2012 | Blaisdell | ................ | G06F 21/53 |
| | | | | 726/26 |
| 2013/0091543 A1* | 4/2013 | Wade | ...................... | G06F 21/54 |
| | | | | 726/1 |
| 2014/0007222 A1* | 1/2014 | Qureshi | .................. | G06F 21/10 |
| | | | | 726/16 |
| 2014/0047534 A1* | 2/2014 | Tse | ...................... | H04L 63/0272 |
| | | | | 726/13 |
| 2014/0047548 A1* | 2/2014 | Bye | ........................ | G06F 21/74 |
| | | | | 726/26 |
| 2014/0074569 A1* | 3/2014 | Francis | ................. | G06Q 20/40 |
| | | | | 705/14.3 |

\* cited by examiner

ADAPTING A MOBILE APPLICATION TO A PARTITIONED ENVIRONMENT

CROSS REFERENCE TO OTHER APPLICATIONS

This application is a continuation of co-pending U.S. patent application Ser. No. 13/669,082, entitled ADAPTING A MOBILE APPLICATION TO A PARTITIONED ENVIRONMENT, filed Nov. 5, 2012, which claims priority to U.S. Provisional Patent Application No. 61/555,183, entitled SYSTEM AND METHOD FOR ADAPTING A MOBILE APPLICATION TO A PARTITIONED ENVIRONMENT, filed Nov. 3, 2011, both of which are incorporated herein by reference for all purposes.

BACKGROUND OF THE INVENTION

Mobile devices, such as smartphones and tablets, typically run modern mobile operating systems (mobile OS) such as Google Android, Apple iOS, Blackberry OS, Windows Phone, and so on and are often connected to one or more application distribution servers. This distribution server, often referred to as a Store or Market, provides access to a plethora of mobile applications. These mobile applications are often built using a software development kit provided for the mobile OS. The applications and the mobile OS are designed to inter-operate with one another and share data using documented and undocumented APIs. Sharing of data may either happen intentionally (e.g., contacts app providing APIs to access contacts) or without the user's knowledge (e.g., a file surreptitiously written by one application to a removable storage medium). Once an application has been installed, the user often has little say on how the application shares data. This is especially problematic in a corporate environment that requires policies governing who can share what with whom. Most mobile devices have a single layer of security. There is no ability to create separate zones for storing different data sets accessible by different applications especially when the applications are from multiple vendors.

There are a few solutions that have been proposed to solve this problem. One is to create a virtual machine application such as VMware™ that creates a virtual instance of a mobile device. This virtual device will then run another instance of the mobile OS platform such as Android. Each secure zone is mapped to an instance of a virtual machine. However, such a solution requires that the OS platform be modified and it may incur the performance penalties associated with the overhead of a virtual machine implementation on a hardware platform that is not optimized for virtualization applications.

BRIEF DESCRIPTION OF THE DRAWINGS

Various embodiments of the invention are disclosed in the following detailed description and the accompanying drawings.

DETAILED DESCRIPTION

Figure 1:
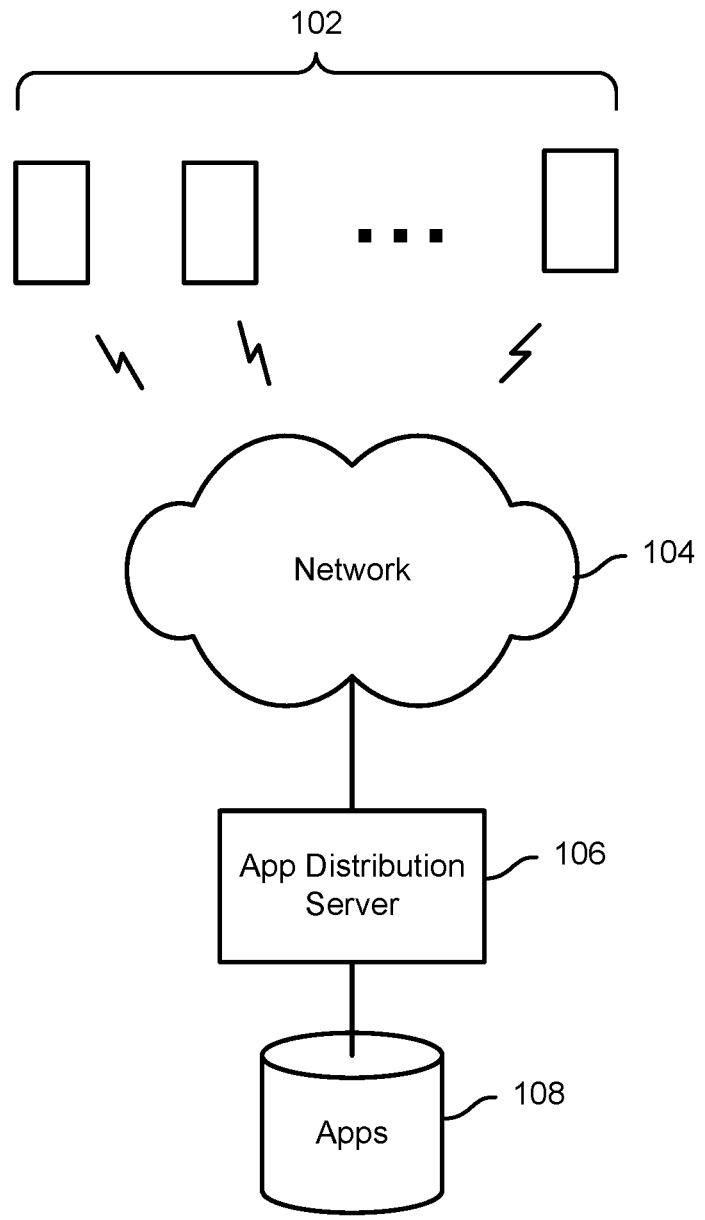
FIG. 1 is a block diagram illustrating an embodiment of a prior art mobile app distribution system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Adapting a mobile or other application ("app") to a partitioned environment is disclosed. In various embodiments, a "secure zone" or other logical partition is created and enforced at least in part by adapting a mobile or other app to behave in a manner required by and/or otherwise associated with the secure zone or other partition and which behavior is or in various embodiments may be different than a native behavior of the mobile or other app as designed and written by an application developer of the app. In some embodiments, the modification may include dynamic, real time modification and/or replacement of an app that has been installed or attempted to be installed, and causing the modified and/or replacement app to be installed and used instead. In various embodiments, examples of required behaviors that an app may be modified (or replaced) to exhibit include without limitation storing app content (e.g., files or other objects) in encrypted form, sharing encrypted content with other apps in the secure zone, performing network communications only via a virtual private network or other secure connection associated with the secure zone, sharing content via a clipboard available only to apps associated with the secure zone, and storing files or other content in a manner that ensures apps not associated with the secure zone do not have access to or awareness of the content.

FIG. 1 is a block diagram illustrating an embodiment of a prior art mobile app distribution system and environment. In the example shown, a plurality of mobile devices 102 connect via a network 104 to an app distribution server 106 to download via network 104 selected apps 108. For example, an app "store" or "marketplace" may be used by users of mobile devices to download and install apps on mobile devices 102.

As noted above, by design, mobile operating systems are configured to allow the sharing of data between apps, and in general they provide only one common level of security across the mobile device. However, an enterprise or other entity and/or user may desire to allow only certain apps to have access to a protected set of content data. For example, a business that provides mobile devices to employees may want only certain apps and not others to be used for business purposes, and to have access to business data, e.g., to avoid having data become corrupted or "leaked" to unauthorized apps and/or users.

Figure 2:
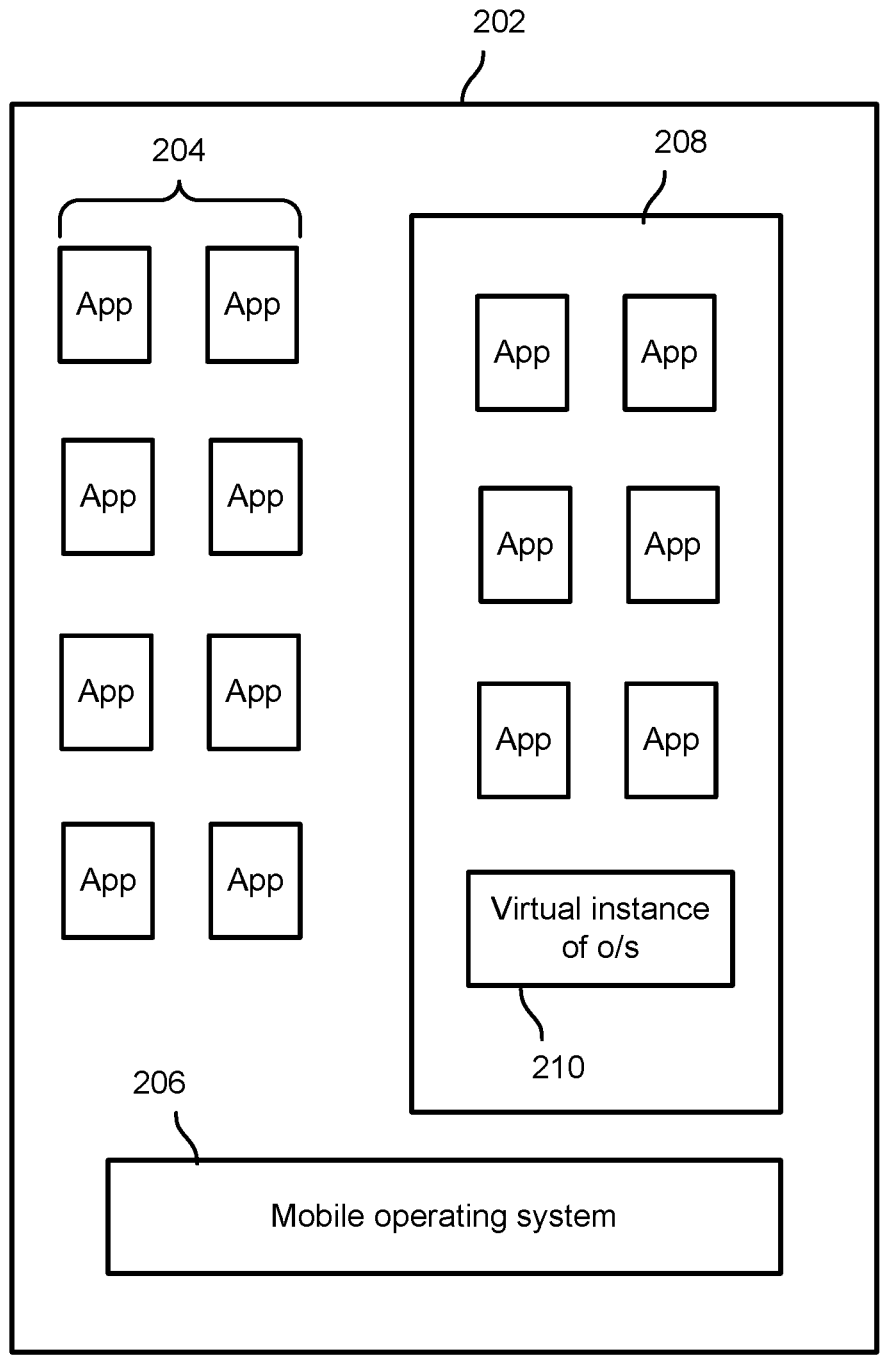
FIG. 2 is a block diagram illustrating an embodiment of a prior art partitioned mobile device.

FIG. 2 is a block diagram illustrating an embodiment of a prior art partitioned mobile device. In the example shown, virtual machine technology (e.g., software) is used to partition mobile device 202 into an unsecure zone in which apps 204 run on mobile operating system 206 without restriction. In a secure zone operating in a virtual machine environment 208, authorized and/or restricted apps run on a virtual instance 210 of the mobile operating system 206. While the prior art approach shown in FIG. 2 may enable desired restrictions to be place on apps running within the virtual machine environment 208, there is significant complexity, overhead, and potentially latency associated with providing and maintaining virtual machine environment 208. In addition, as noted above the virtual machine approach requires special access to the mobile operating system 206, and as a result is not available as an aftermarket solution to provide a secure partition on a mobile device.

Therefore, an approach that provides a secure zone on a mobile device without requiring a virtual instance of the mobile operating system operating in a virtual machine environment is disclosed. In various embodiments, mobile apps are modified and/or replaced as needed to cause the app as installed in connection with a secure zone to exhibit one or more behaviors required by and/or otherwise associated with the secure zone. In some embodiments, when a user attempts to install a new mobile app in the secure zone, the app is sent to a compliance server that generates or otherwise provides a modified and/or replacement app that exhibits the desired behavior. In various embodiments, the app may be reverse engineered and/or modified in real time, at app install attempt time for example, to generate dynamically the modified and/or replacement app. In some embodiments, the process is transparent to the user. In some embodiments, one or more modified mobile operating system components may be generated and/or otherwise provided, and in some embodiments a modified and/or replacement app may be configured to invoke the modified mobile operating system component in place of the native counterpart.

Figure 3A:
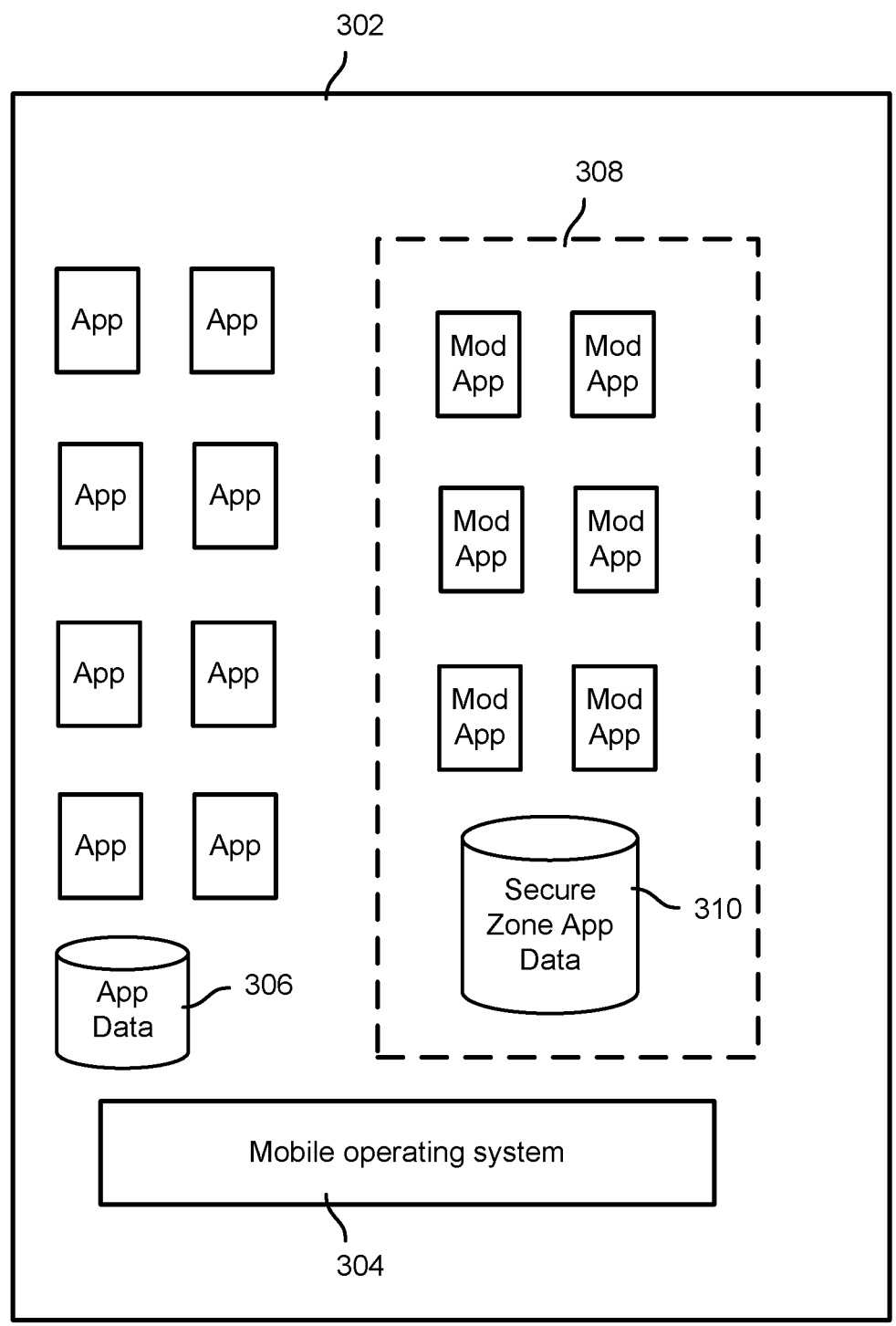
FIG. 3A is a block diagram illustrating an embodiment of a mobile device partitioned to include a secure zone.

FIG. 3A is a block diagram illustrating an embodiment of a mobile device partitioned to include a secure zone. In the example shown, the mobile device 302 includes in an unsecure zone a plurality of apps (at left) running on a mobile operating system 304. The mobile apps in the unsecure zone create, modify, and store app data stored in a non-secure app data storage 306. In the secure zone 308, a plurality of modified apps ("mod apps") run on the same mobile operating system 304, not on a virtual instance of the operating system as shown in FIG. 2 for example. The modified apps are configured to store associated app data in secure zone app storage 310. For example, in some embodiments, the underlying storage is shared between apps in the secure zone 308 and apps not in the secure zone 308, however content associated with an app in the secure zone is encrypted using a key that is only made accessible to apps in the secure zone.

Figure 3B:
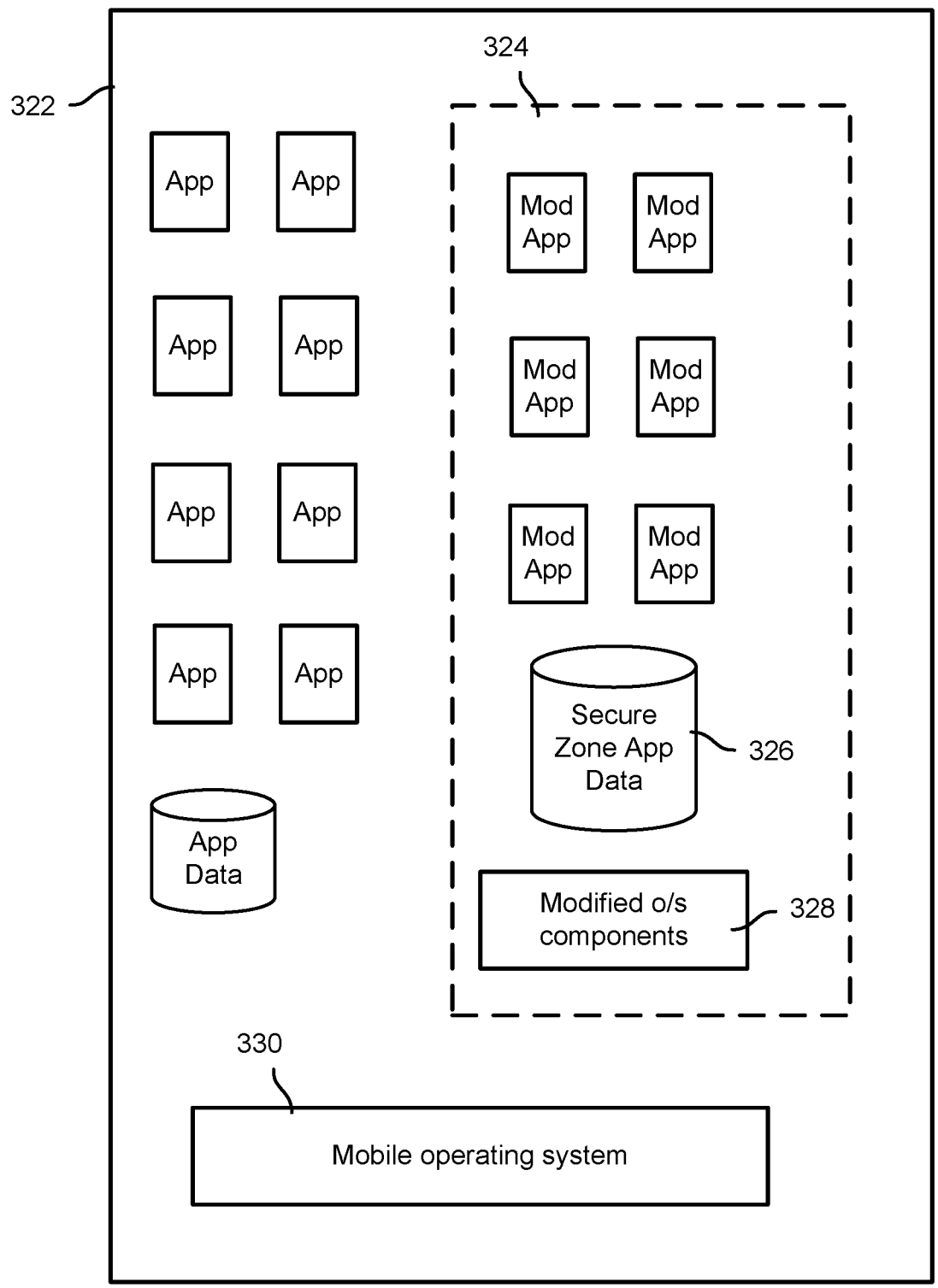
FIG. 3B is a block diagram illustrating an embodiment of a mobile device partitioned to include a secure zone.

FIG. 3B is a block diagram illustrating an embodiment of a mobile device partitioned to include a secure zone. In the example shown, the mobile device 322 includes apps running in an unsecure zone, and modified apps in secure zone 324. Apps in the secure zone have been modified to store content data in secure zone app data storage 326. In this example, one or more modified mobile operating system components 328 are provided. Modified apps in the secure zone 324 are configured in various embodiments to invoke a replacement mobile operating system component, such as a replacement "file" class or other component, which in turn is configured to encrypt content data prior to storage. In various embodiments, the replacement component is configured to perform or facilitate the performance of a desired behavior, such as encrypting or decrypting app content and/or causing only secure zone content to be visible to secure zone apps.

Figure 4:
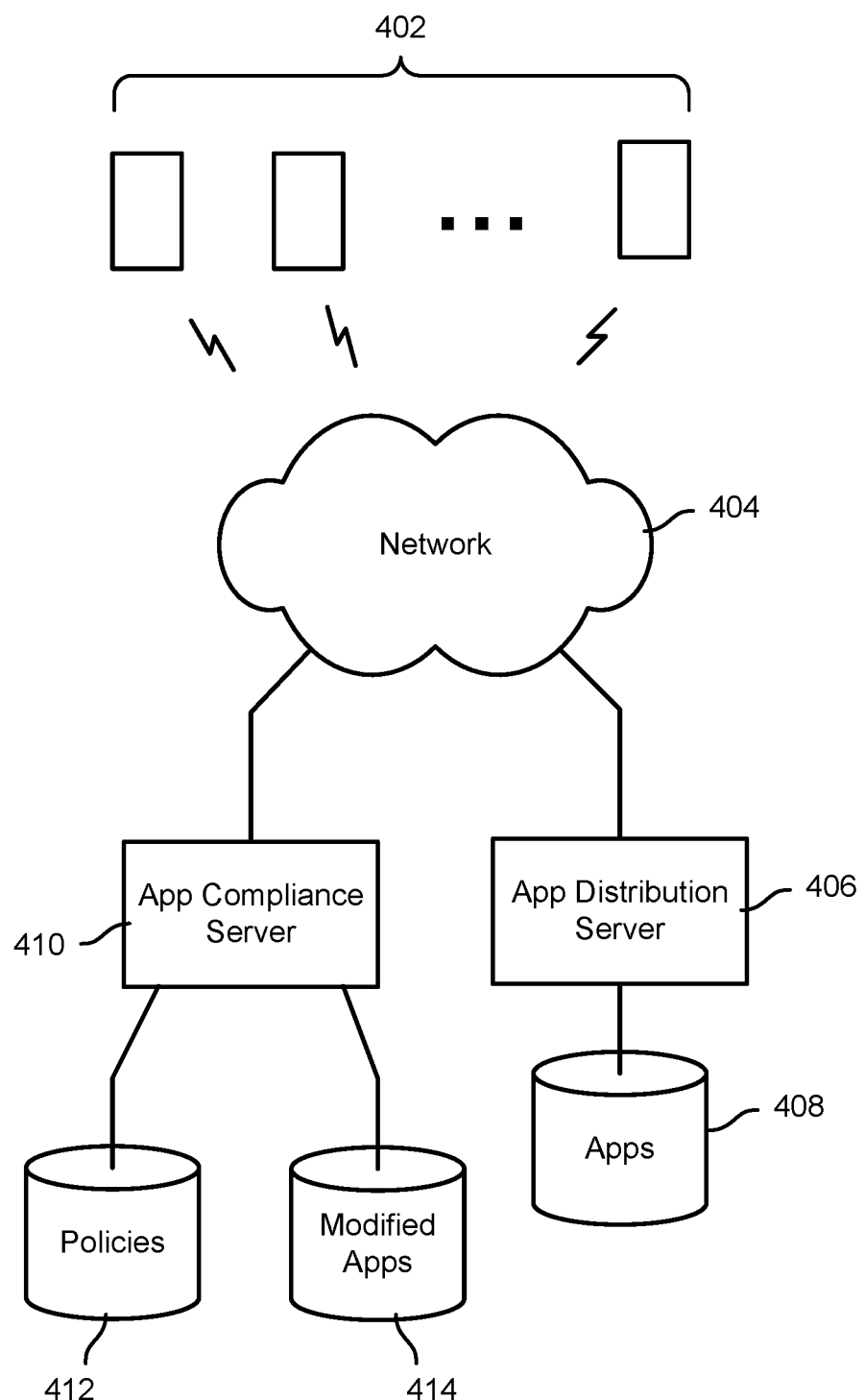
FIG. 4 is a block diagram illustrating an embodiment of a system to adapt a mobile app to a partitioned environment.

FIG. 4 is a block diagram illustrating an embodiment of a system to adapt a mobile app to a partitioned environment. In the example shown, mobile devices 402 connect via network 404 to app distribution server 406 to access and download selected apps 408. In various embodiments, apps downloaded to a mobile device 402 are sent via network 404 to app compliance server 410. The app is evaluated in real time, for example based on identifying or other meta information and/or real time analysis of binary or other code, to determine which, if any, policies 412 may require transformation and/or replacement of the app prior to installation. If the app requires transformation, a modified app is created, if necessary (e.g., if a policy-compliant version of the apps in already available in modified app storage 414), downloaded to the mobile device, and installed. In some embodiments, the modified app and/or modified portions thereof may be stored in modified app storage 414, for example for future use on another mobile device.

Figure 5:
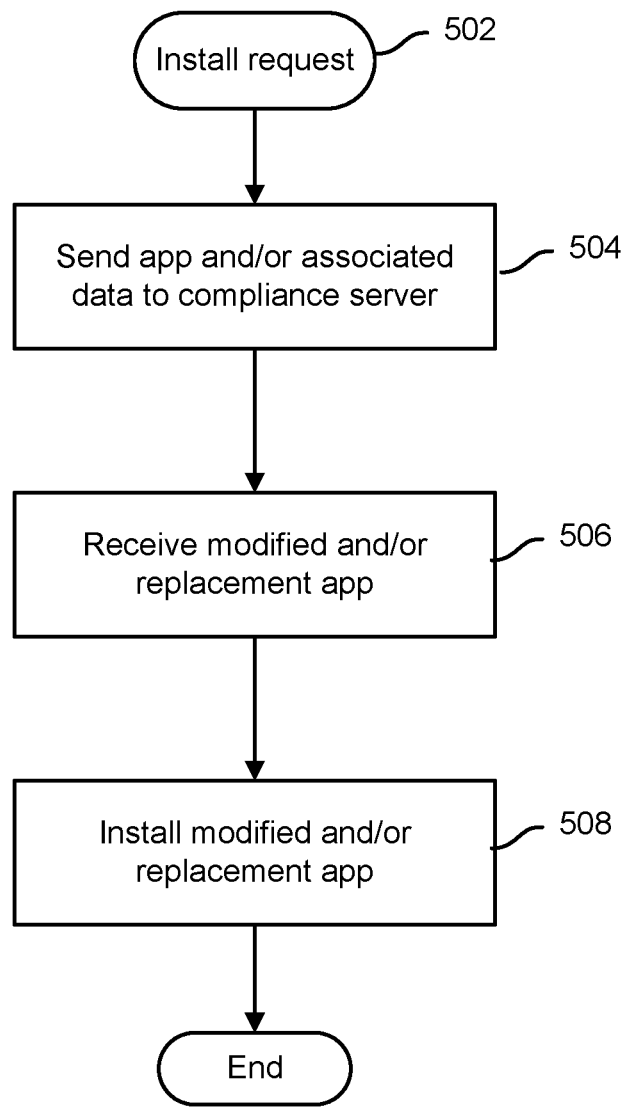
FIG. 5 is a flow diagram illustrating an embodiment of a process to install an app in a secure zone on a mobile device.

FIG. 5 is a flow diagram illustrating an embodiment of a process to install an app in a secure zone on a mobile device. In the example shown, upon receiving an indication that installation of an app has been requested at a mobile device on which the process of FIG. 5 is executing (502) the app and/or associated data is sent to a remote compliance server (504), such as app compliance server 410 of FIG. 4. A modified and/or replacement app is received at the mobile device, for example from the app compliance server (506) and the received modified and/or replacement app is installed at the mobile device (508), e.g., in place of the original, unmodified app.

Figure 6:
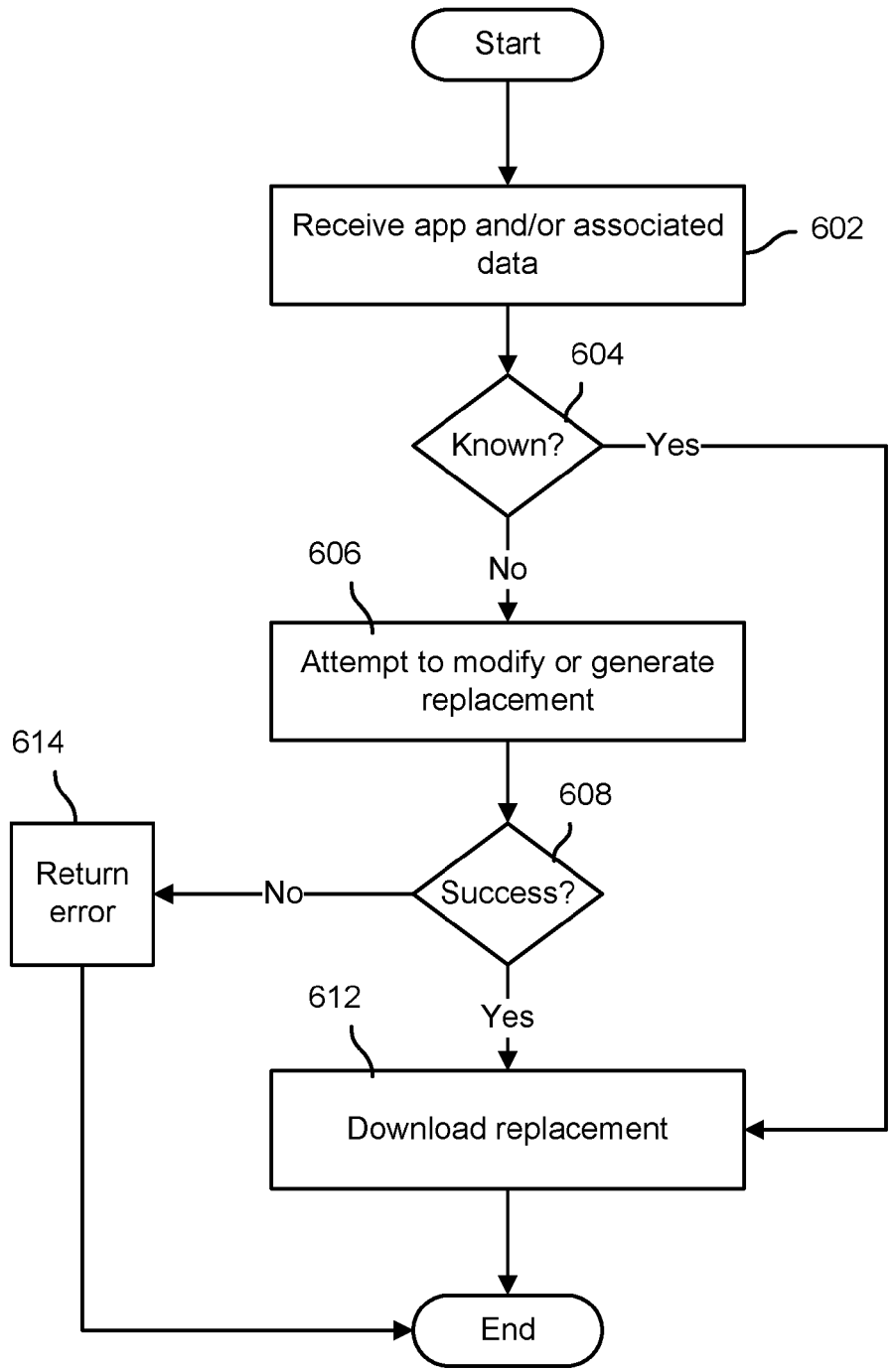
FIG. 6 is a flow diagram illustrating an embodiment of a process to modify or replace an app.

FIG. 6 is a flow diagram illustrating an embodiment of a process to modify or replace an app. In various embodiments, the process of FIG. 6 is implemented by an app compliance server, such as server 410 of FIG. 4. In the example shown, a mobile app and/or associated data (e.g., meta-information) is received (602). If the app is known (604) a previously generated and/or obtained replacement app is downloaded to the mobile device from which the app was received (612). If the app is not already known (604), an attempt is made to modify the app and/or to use the original app to generate a replacement app that has desired behavior(s) (606). If the attempt is successful (608), the generated modified and/or replacement app is downloaded to the mobile device (612). If a modified and/or replacement app that will have the desired behavior(s) cannot be generated (608) an error is returned (614) and installation of the app is prevented.

Figure 7:
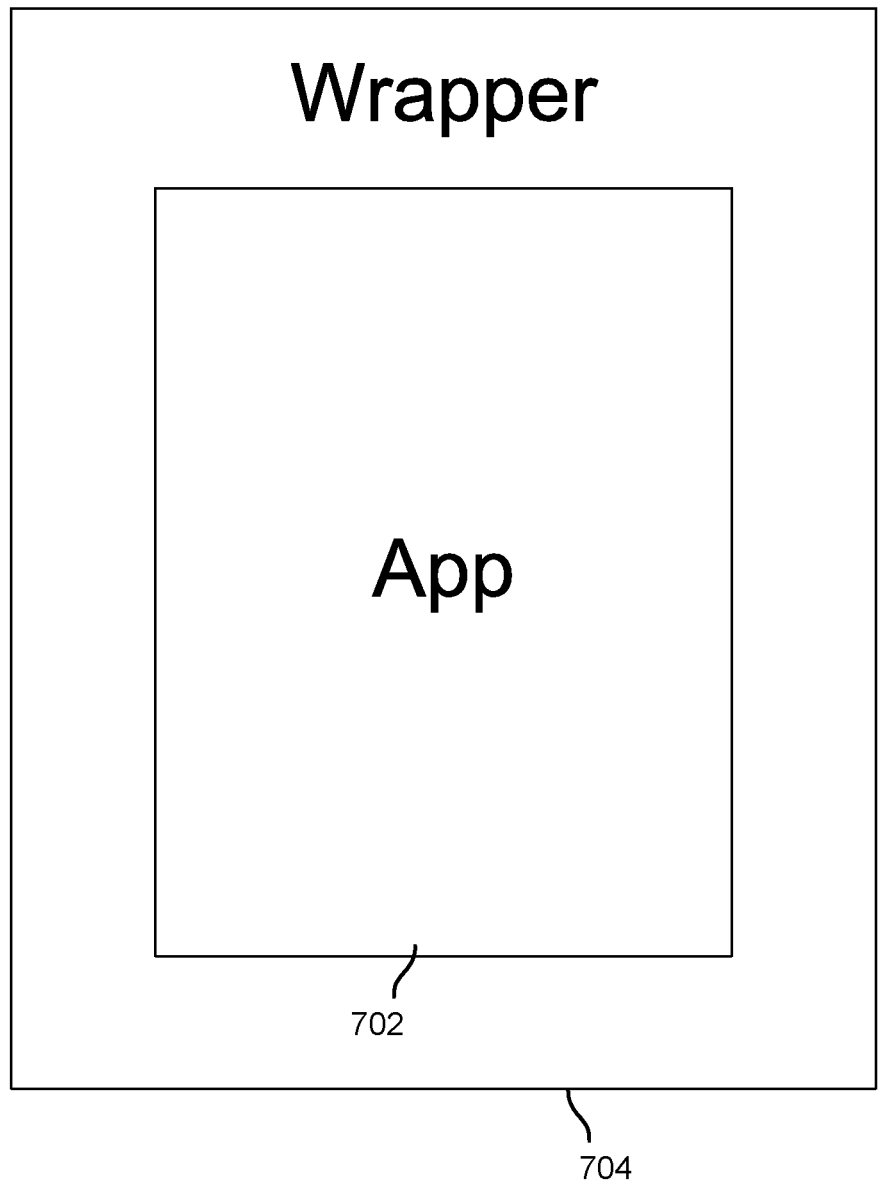
FIG. 7 is a block diagram illustrating an embodiment of a technique to adapt an app to a partitioned environment.

FIG. 7 is a block diagram illustrating an embodiment of a technique to adapt an app to a partitioned environment. In the example shown, a mobile or other app 702 has been "wrapped" in an app wrapper 704. The app wrapper 704 is provided in various embodiments by modifying the application code of app 702 to cause modified (wrapped) app 702 modified to behave differently than the corresponding unmodified version of app 702 behaves. For example, in some embodiments, adding wrapper 704 includes reconfiguring app 702 to invoke a supervisory app or other agent, not shown in FIG. 7, to perform operations such as invoking mobile operating system components, using mobile device resources, and accessing or storing app data.

Figure 8:
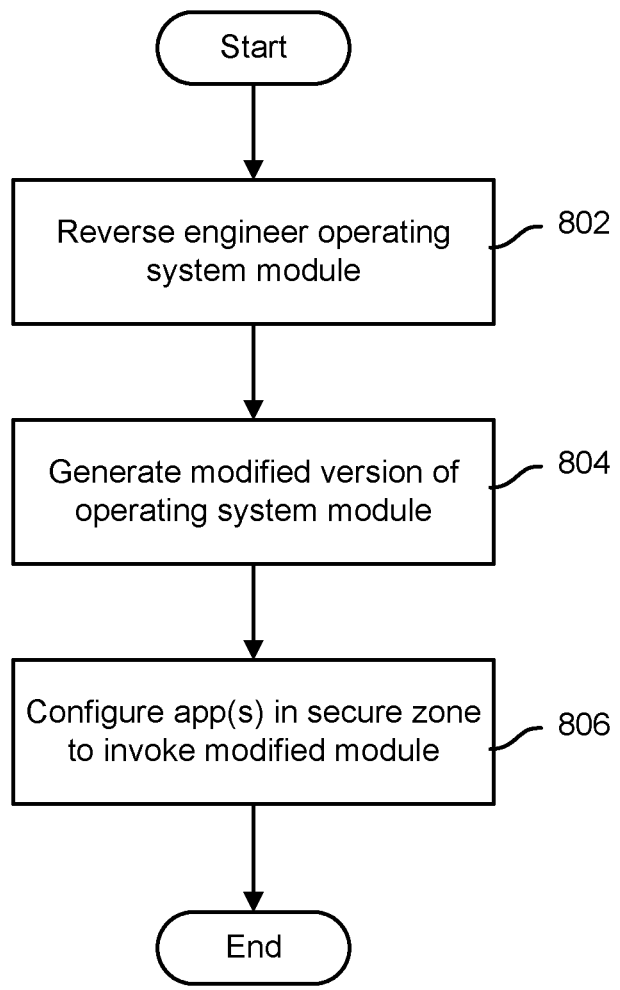
FIG. 8 is a flow diagram illustrating an embodiment of a process to adapt a device and/or an app to provide a partitioned environment.

FIG. 8 is a flow diagram illustrating an embodiment of a process to adapt a device and/or an app to provide a partitioned environment. In the example shown, a component of a mobile operating system is reverse engineered or otherwise analyzed (802) to generate a modified version of the operating system component (804). For example, in some embodiments, one or more Java classes comprising the Android™ operating system are analyzed to generate one or more replacement classes that exhibit a desired behavior. For example, in some embodiments, a modified "file" class is provided, which exhibits desired behaviors such as only listing, when invoked by an app in the secure zone, app data associated with apps in the secure zone. In another example, in some embodiments a modified app "launcher" is provided to ensure that apps not authorized to be installed in the secure zone cannot launch in the secure zone. One or more secure zone apps is/are configured to invoke the modified mobile operating system component, e.g., in place of the corresponding native operating system component (806).

Figure 9:
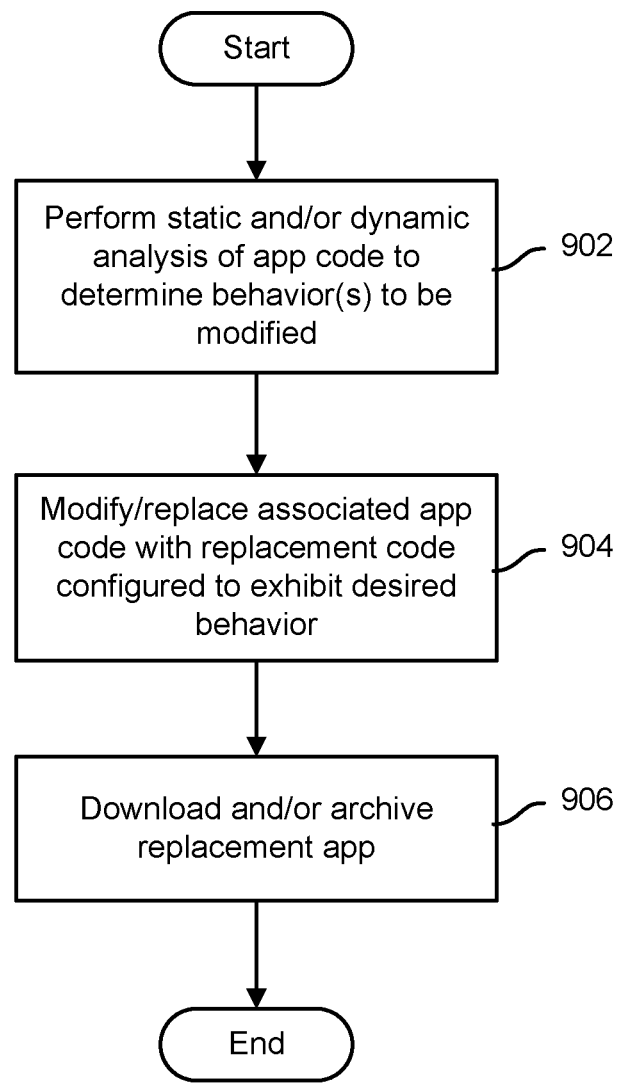
FIG. 9 is a flow diagram illustrating an embodiment of a process to adapt an app to a partitioned environment.

FIG. 9 is a flow diagram illustrating an embodiment of a process to adapt an app to a partitioned environment. In various embodiments, the process of FIG. 9 is used to transform and/or generate a replacement for a previously unknown app that a user has requested to install in a secure zone on a mobile device. In the example shown, static and/or dynamic analysis is performed on the mobile app code to determine behaviors to be modified (902). For example, Java class definition, binary, or other code may be examined statically to identify portions associated with behaviors to be modified, such as accessing and storing app data, performing network communications, etc. In some embodiments, dynamic analysis may be performed, for example by executing the mobile app code in a controlled test environment to observe external manifestations of behaviors that may need to be modified. In the example shown in FIG. 9, application code portions associated with behaviors to be modified is modified and/or replaced as needed to generate a transformed (i.e., modified) app that will exhibit the desired behavior(s) (904). For example, app code that invokes the "list" method of the operating system's "file" class may be modified to instead invoke the corresponding method of a secure zone replacement version of the "file" class. The resulting modified and/or replacement app is downloaded to the mobile device (906).

Figure 10:
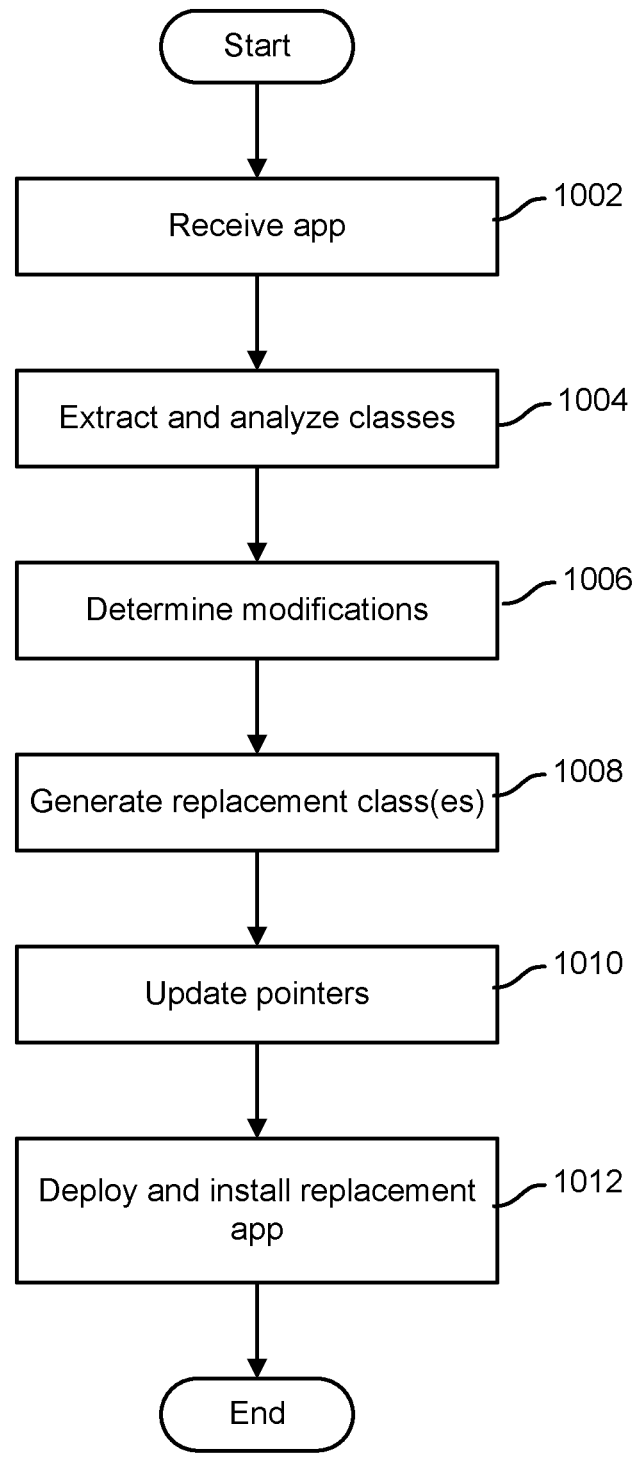
FIG. 10 is a flow diagram illustrating an embodiment of a process to adapt an app to a partitioned environment.

FIG. 10 is a flow diagram illustrating an embodiment of a process to adapt an app to a partitioned environment. In the example shown, a mobile app comprising one or more Java or other classes is received (1002). For example, mobile apps developed to run on the Android operating system may include one or more Java packages each comprising a plurality of Java classes. The classes comprising the app are extracted and analyzed (1004). Required modifications are determined (1006) and replacement classes that reflect the modifications are generated (1008). For example, a method of an application class that has been determined to invoke a native "list" method of the mobile operating system's "file" class may be modified to instead invoke a corresponding method of a replacement mobile operating system component associated with a secure zone. Pointers, e.g., from other application classes to the modified class(es), are updated in the application classes as required (1010). Once all modifications have been made and pointers updated, as required, the resulting replacement app (i.e., an application package comprising the modified application classes) is deployed to and installed at the mobile device (1012).

Figure 11:
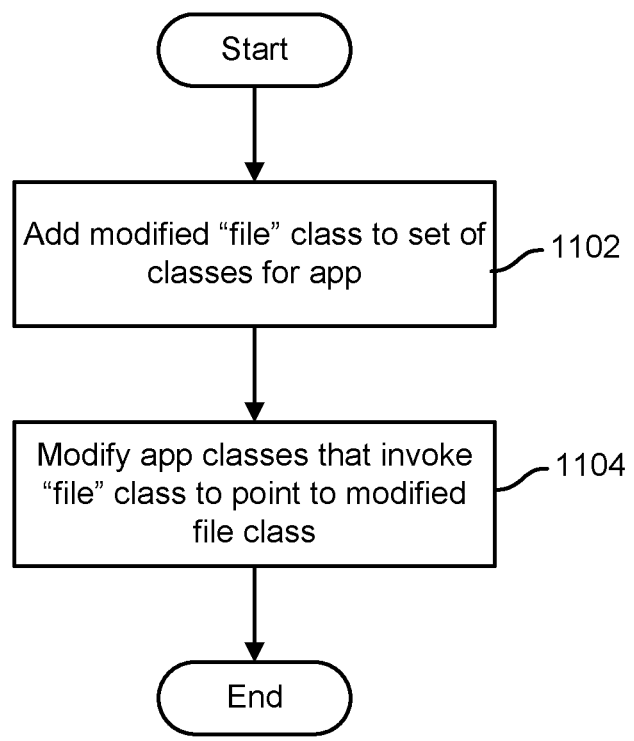
FIG. 11 is a flow diagram illustrating an embodiment of a process to adapt an app to a partitioned environment.

FIG. 11 is a flow diagram illustrating an embodiment of a process to adapt an app to a partitioned environment. In the example shown, a modified "file" class is added to a set of classes comprising a mobile app (1102). For example, an original, unmodified "file" class may be removed from the application and replaced with the modified "file" class. Other application classes that invoke the "file" class are updated as required to ensure such classes invoke the modified "file" class (1104). As noted above, such a modified class may be configured to perform desired behaviors, such as only listing files associated with secure zone apps, only listing encrypted files, ensuring app data associated with the secure zone is encrypted, etc.

Figure 12:
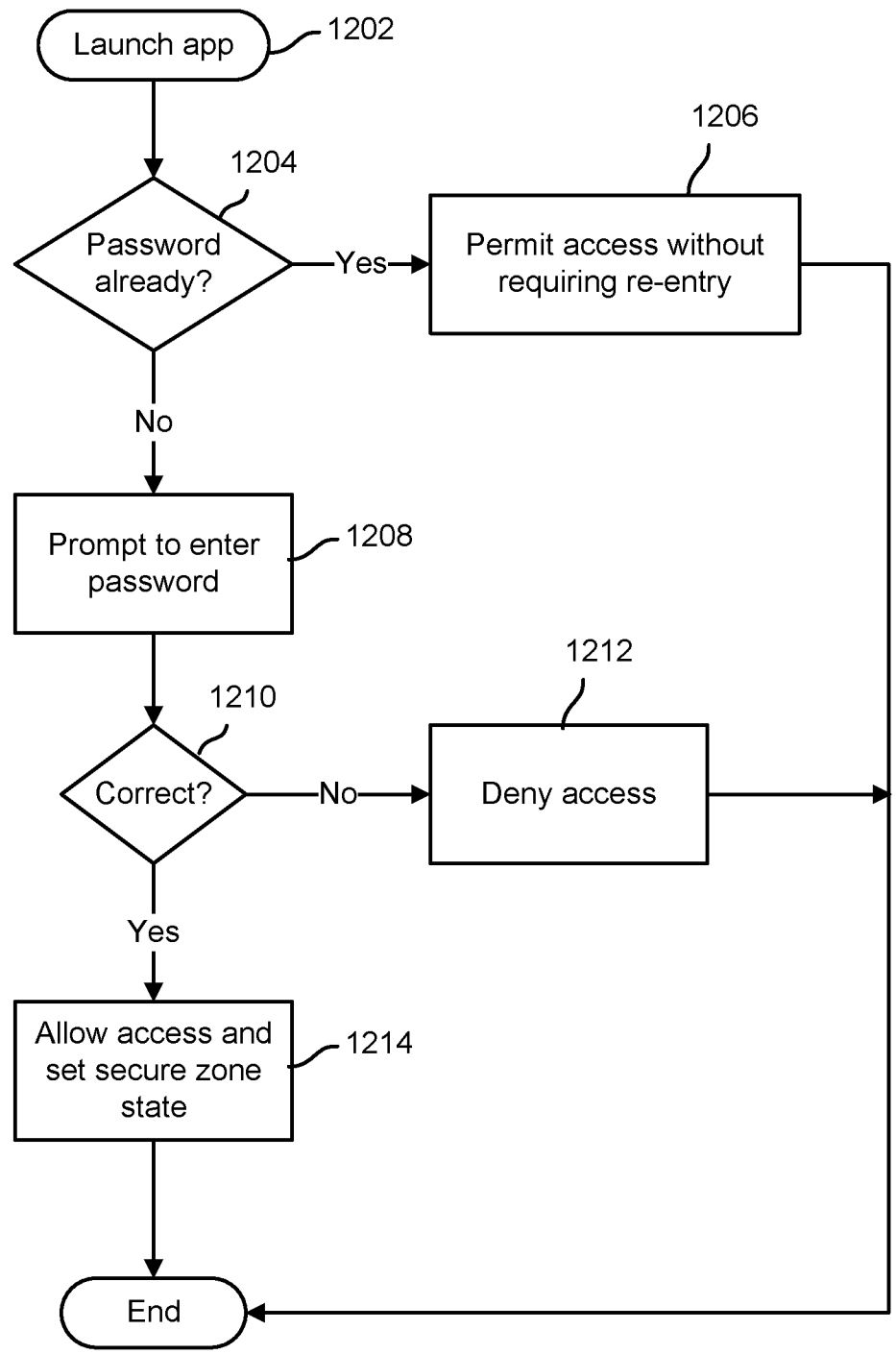
FIG. 12 is a flow diagram illustrating an embodiment of a process to provide security for a secure zone on a mobile device.

FIG. 12 is a flow diagram illustrating an embodiment of a process to provide security for a secure zone on a mobile device. In various embodiments, it may be desirable to require that a single secure zone password be entered to access apps and/or app data in the secure zone; however, it may be desired to allow access for a time to all apps and/or associated app data in the secure zone once the password has been entered for one app in the secure zone. In the example shown in FIG. 12, when an app is launched in the secure zone (1202), it is determined whether a secure zone password has already been entered and has not timed out (e.g., due to inactivity in the secure zone) (1204). If a password has already been added, for example in connection with use of another app in the secure zone (1204), then access is permitted without requiring re-entry of the secure zone password (1206). If a password has not already been entered and/or has timed out (1204), the user is prompted to enter the secure zone password (1208). If the correct password is not entered (1210), access is denied (1212). If the correct password is entered (1210), access is granted and the secure zone is set to a "password already entered" state (1214).

Figure 13:
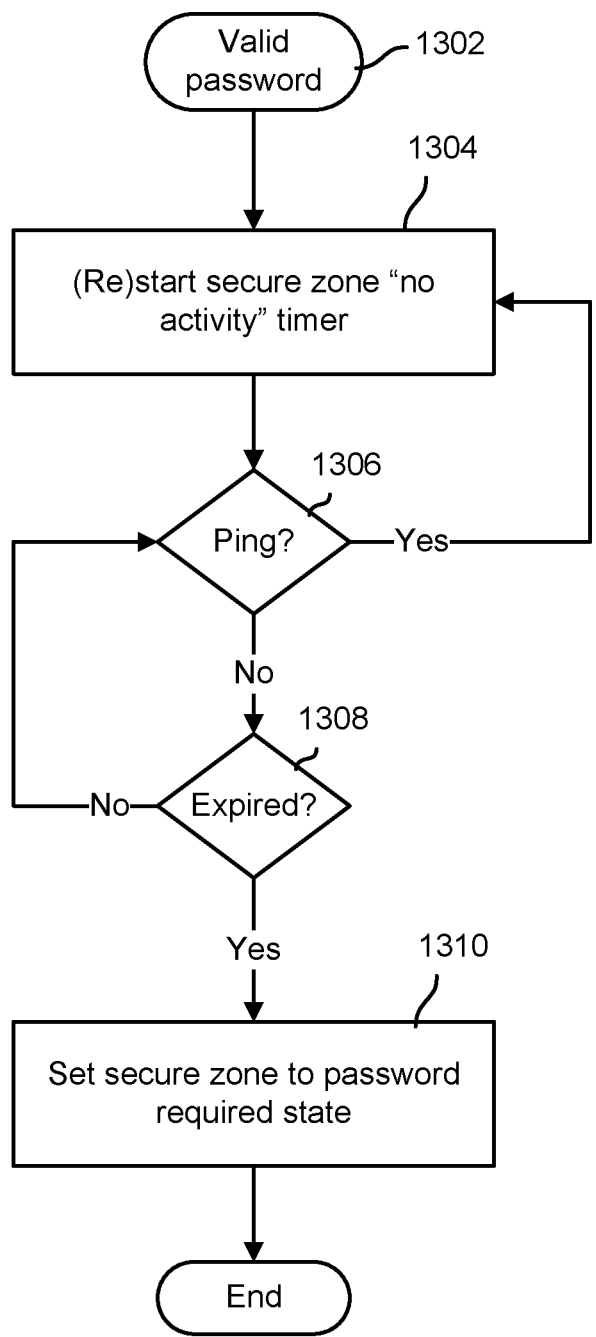
FIG. 13 is a flow diagram illustrating an embodiment of a process to provide security for a secure zone on a mobile device.

FIG. 13 is a flow diagram illustrating an embodiment of a process to provide security for a secure zone on a mobile device. In the example shown, upon entry of a valid secure zone password (1302), a secure zone "no activity" timer is set or reset, as applicable (1304). Each time a "ping" indicating recent secure zone app activity is received (1306) before the "no activity" timer has expired (1308), the "no activity" timer is reset (1304). If the "no activity" timer expires (1308), the secure zone is set to a "password required" state (1310), which in various embodiments results in the user being prompted to enter the secure zone password the next time the user attempts to use a secure zone app, e.g., as in step 1208 of FIG. 12.

Figure 14:
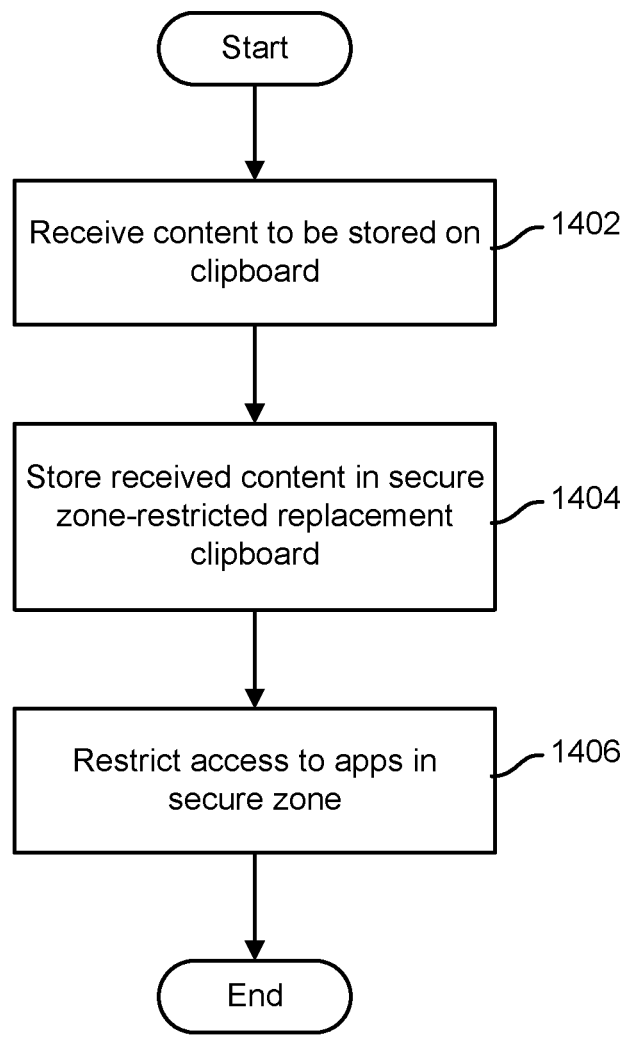
FIG. 14 is a flow diagram illustrating an embodiment of a process to facilitate secure sharing of content.

FIG. 14 is a flow diagram illustrating an embodiment of a process to facilitate secure sharing of content. In various embodiments, a replacement clipboard component is provided for the secure zone and configured to enable secure zone apps to share content via the replacement clipboard, which is not available to or seen by apps not in the secure zone. In the example shown, content to be store on the clipboard is received (1402), for example as a result of an operation by an app in the secure zone. For example, content created and/or viewed using the app is "cut" or "copied". The received content is stored in a secure zone-restricted replacement clipboard (1404). In various embodiments, the replacement clipboard is provided by including in the secure zone a secure zone app, agent, or other component configured to provide secure zone clipboard functionality, and configuring secure zone apps to invoke and use the replacement clipboard instead of the native clipboard associated with the mobile operating system. Access to content placed on the secure zone clipboard is restricted, for example to apps in the secure zone (1406). In some embodiments, the replacement clipboard is configured to return a null result to apps not in the secure zone.

Figure 15:
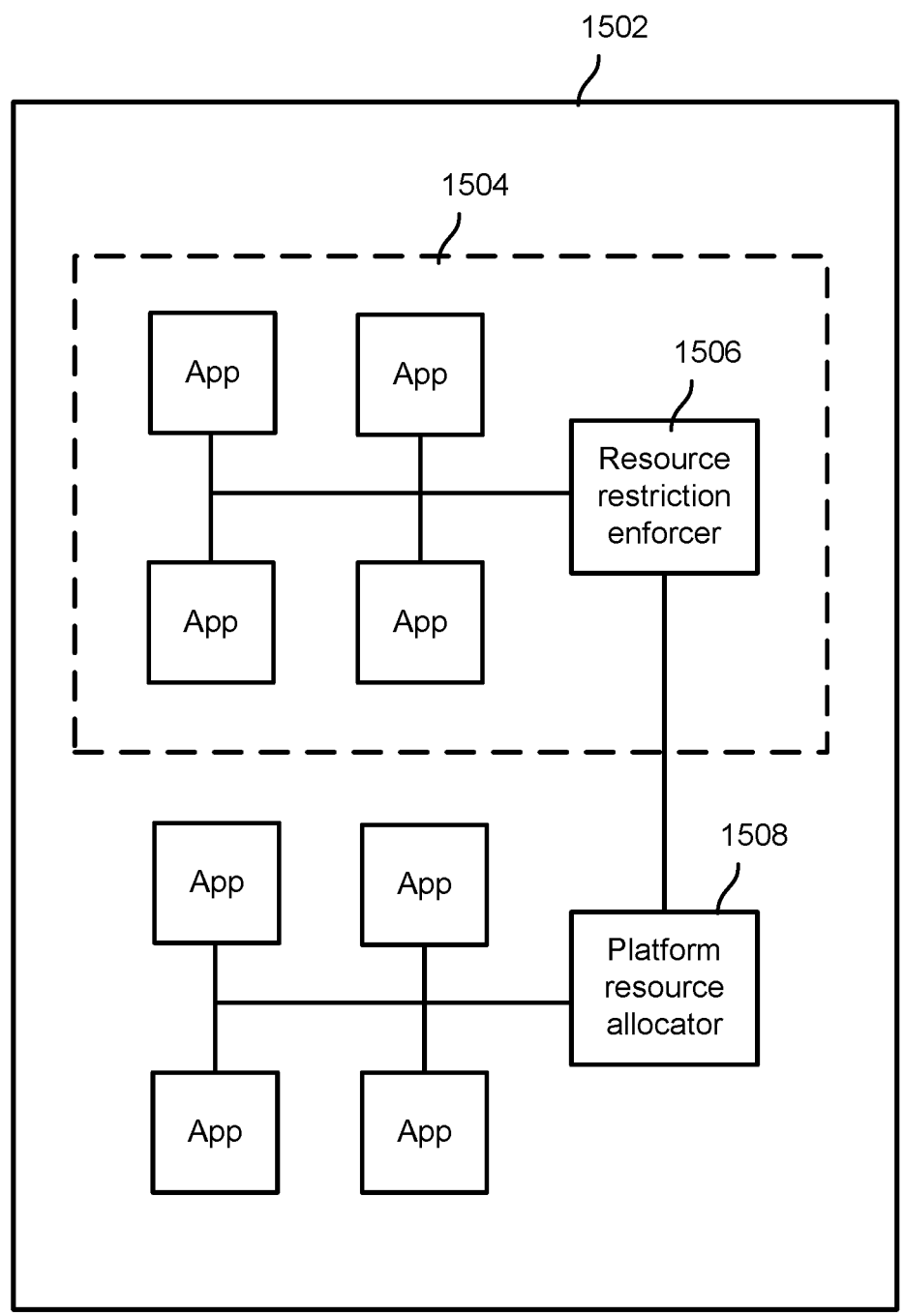
FIG. 15 is a block diagram illustrating an embodiment of a system to provide a secure zone on a mobile device.

FIG. 15 is a block diagram illustrating an embodiment of a system to provide a secure zone on a mobile device. In various embodiments, requests by apps in the secure zone to use operating system and/or mobile device resources may be intercepted or otherwise received by an agent or other component configured to enforce restrictions or other requirements with respect to the use of such resources by secure zone apps. For example, secure zone apps may be required to store data in encrypted form and/or to perform network communications only via a virtual private network (VPN) or other secure tunnel. In the example shown in FIG. 15, the mobile device 1502 includes a secure zone 1504 in which a plurality of (modified) apps are configured to invoke mobile operating system and/or device resources through a resource restriction enforcer 1506, which in the example shown acts on behalf of the requesting app, to the extent the app's resource request is allowed and/or in a manner associated with the secure zone, to obtain and/or use the resource via a request to platform resource allocator 1508. In some embodiments, the resource restriction enforcer 1506 may provide access to resources, if allowed, directly rather than going through the platform resource allocator 1508. Examples of resource restrictions being enforced as shown in FIG. 15 include, without limitation, allowing secure zone apps to connect with remote servers via network communications, but imposing restrictions such as requiring communications to be encrypted, allowing communications only to prescribed remote servers and/or only via a VPN or other secure channel, and limiting network communications to certain times of day and/or days of the week and/or from certain geographic and/or physical locations. Other examples include replacing resources with replacement components to prevent or otherwise restrict access, such as restriction enforcers configured to return an indication that the "contacts" set is empty if a secure zone app attempts to access a contacts list or other address book, a component configured to return an indication that the mobile device does not have a camera even if it does, and a component that returns an indication that no wife or other "hot spot" is detected even if one is detected to be present but at a location at which the mobile device is not desired to be allowed to perform network communications using apps in the secure zone.

Figure 16:
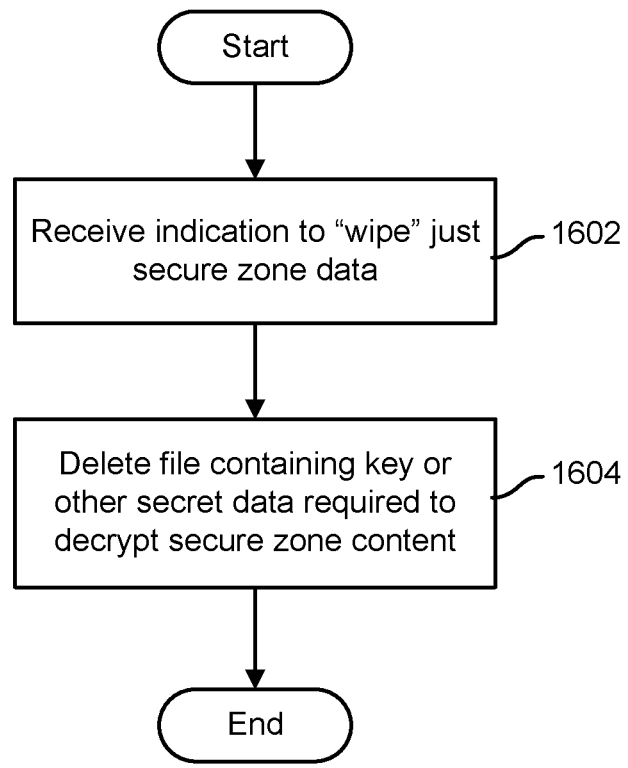
FIG. 16 is a flow diagram illustrating an embodiment of a process to render protected data inaccessible on a mobile device.

FIG. 16 is a flow diagram illustrating an embodiment of a process to render protected data inaccessible on a mobile device. In various embodiments, it may be desirable to be able to "wipe" or to simulate wiping a mobile device remotely, for example by rendering secure zone data inaccessible at the mobile device. For example, if a mobile device provided with a secure zone to keep work apps and associated data safe while allowing the device to be used for personal use, e.g., using apps not in the secure zone, is lost or stolen, or if the user's employment is terminated, it may be desirable to be able to render just (or at least) the secure zone data inaccessible at the mobile device. In the example shown in FIG. 16, an indication to "wipe" just the secure zone data on a mobile device is received (1602), for example by an agent on the device. In this example, secure zone data is encrypted and stored in encrypted form, and a key needed by secure zone apps to decrypt the data is stored on the mobile device. To gain access to secure zone data, a user is prompted to enter a secure zone password that enables the previously stored key to be used to decrypt secure zone data. In the example shown, the file containing the key required to decrypt secure zone data is deleted (1604), for example by the agent mentioned above. In some embodiments, the key also is stored securely at the server, which would enable secure zone data to be "recovered" and rendered accessible again to secure zone apps at the mobile device, for example upon recovery of a lost or stolen mobile device. In some embodiments, secure zone data is backed up periodically to a remote server and recovery, if needed, is performed using the backed up copy of secure zone data.

Figure 17:
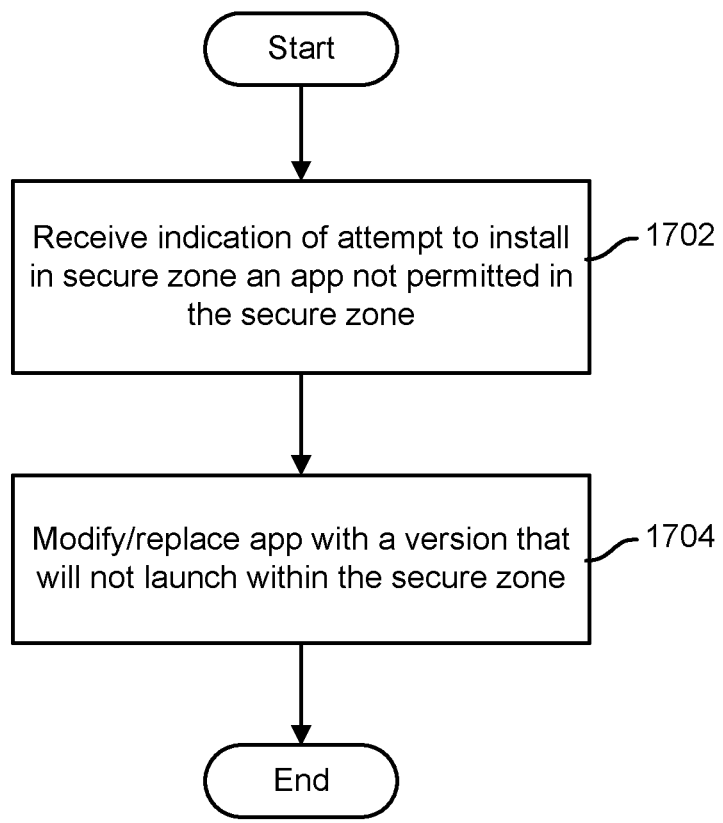
FIG. 17 is a flow diagram illustrating an embodiment of a process to exclude an app from a secure zone on a mobile device.

FIG. 17 is a flow diagram illustrating an embodiment of a process to exclude an app from a secure zone on a mobile device. Some mobile operating systems do not provide a mechanism for an app or app-level agent (as opposed to the operating system itself) to selectively prevent an app from being downloaded and/or installed at a mobile device, and/or to cause an app to be uninstalled. In various embodiments, this limitation is address at least in part by enabling an app that a user has downloaded and installed on a mobile device to be rendered inoperable and/or invisible, for example by replacing the app with one that will not launch within the secure zone. In the example shown, an indication is received of an attempt to install in the secure zone an app that is not authorized to be installed in the secure zone (1702). The app is modified and/or replaced with a version that will not launch in the secure zone (1704). For example, in some embodiments the app is configured to invoke a replacement "launcher" component that will not actually launch the app.

Figure 18:
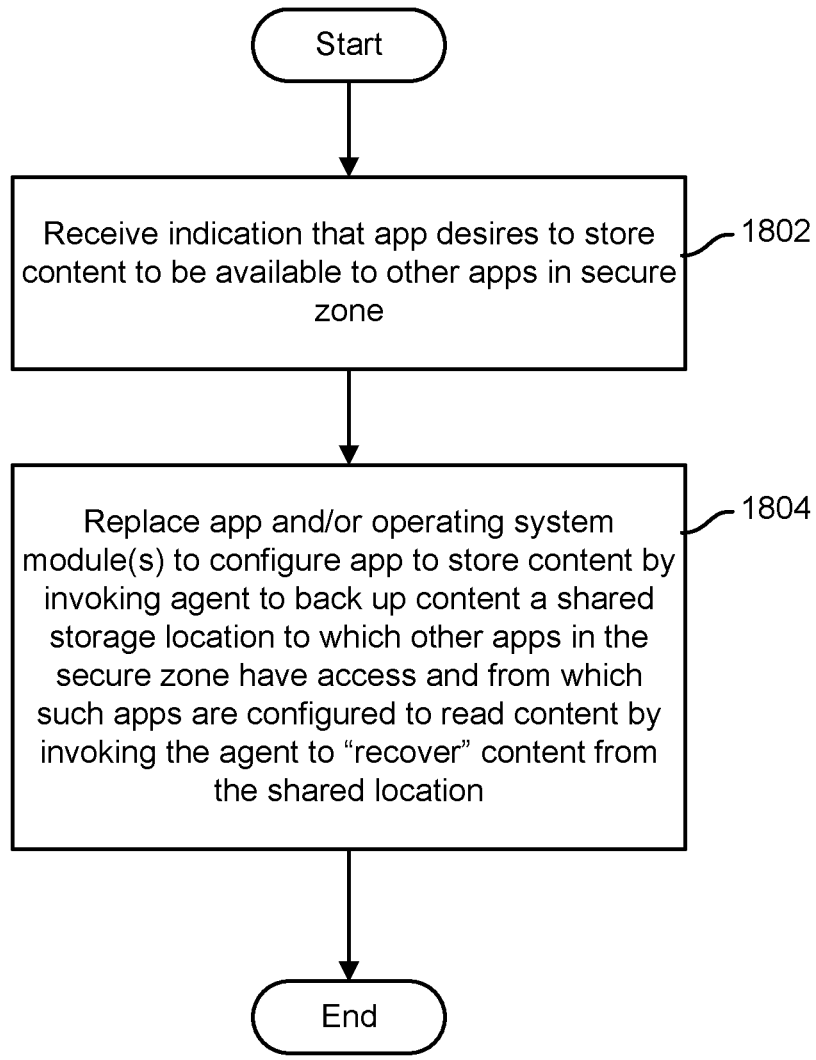
FIG. 18 is a flow diagram illustrating an embodiment of a process to facilitate secure sharing of content among apps in a secure zone.

FIG. 18 is a flow diagram illustrating an embodiment of a process to facilitate secure sharing of content among apps in a secure zone. In various embodiments, it may be desirable to facilitate the sharing of app content data among apps in the secure zone while preventing access to secure zone app content by apps not associated with the secure zone. In the example shown in FIG. 18, an indication is received that an app desires to store content to be available to other apps in the secure zone, but not to apps not in the secure zone (1802). In this example, apps and/or operating system components are replaced as required to configure apps in the secure zone to store content by invoking a secure agent to back up content a shared storage location to which other apps in the secure zone have access and from which such apps are configured to read content by invoking the agent to "recover" content from the shared location (1804). In this way, apps in the secure zone have access to shared content while apps not in the secure zone do not.

ILLUSTRATIVE EXAMPLES

The following paragraphs discuss, by way of example and without limitation, specific modifications made in various embodiments with respect to apps in secure zones provided on mobile devices that use the Android™ operating system.

As described above, existing OS platforms do not permit most forms of platform modification to be made by an application. In various embodiments, this restriction is overcome by instead providing at least one secure zone independent of the OS platform and modifying the applications to utilize these secure zones. These modifications are typically made by a multistep process which may include some or all of the following (a) Software modifications, (b) Manifest modifications, (c) Application packaging, (d) Resource modification.

The steps below are only one example of an implementation for Android™, a particular mobile OS, but these steps should easily generalize to other systems. Other implementations for Android and other mobile OS platforms are also contemplated.

The following is a non-exhaustive list of possible modifications for the Android platform, made of which some or all may be used in particular embodiments. This list should only serve as an example, as many other possible implementation techniques may be used.

Activity:

The class "activity" is implemented by each application for each UI screen to be shown. This class has several methods that are invoked by the system throughout the application life-cycle. Some of these methods may be modified to support the secure zone. Exemplary methods to modify and exemplary methods for modification are listed below.

Activity.onResume or similar method: This method is invoked every time the user interface (UI) screen is shown.
   If an application does not implement onResume( ), insert an implementation that simply calls super.onResume( ) and returns so that it can be further modified
   Insert code that implements some of the following algorithm
      Check if we have the relevant password and encryption key(s). If yes, do nothing and continue with the rest of this method
      If no, then invoke the AcquireKey method of the key management agent and return acquire relevant encryption key(s), possibly via prompting for a password or other authentication mechanism
      Start a timer that periodically sends the key management agent a 'keep alive' message that the application is being used by the user and therefore the password encryption keys probably should not be expired Activity.onActivityResult or similar method:
   Check to see if the invocation is a result of a previous call to AcquireKey. If yes, then this method will allow us to deduce the relevant key(s). The system will call onResume once again and the relevant key(s) will may get used there Activity.onPause or similar method:
   If an application does not implement onPause( ), insert an implementation that simply calls super.onPause( ) and returns so that it can be further modified
   Stop the timer that sends a 'keep alive' message. A key management agent will pick up on this and possibly use this fact to determine if it should timeout the encryption keys if, for instance, no other application needs it.

The above methods can also be used to limit access to desginated applications, such as only allowing designated applications to execute during certain times of day/certain days, or only when the GPS/other location techniques confirms that the user is in a designated location.

Provider:

The class "provider" is commonly used by applications that expose a data API to other applications. The provider often stores its data in a file or a database and does not present a UI for direct interaction. Some of the following modifications are may be made to ensure that the provider has the relevant encryption-key(s) before performing operations which require the use of these keys, such as reading/writing files. Thus before the encryption-key is required, a call is made to a key management module requesting the encryption key. The provider may or may not expire the encryption key.

Service:

The class "Service" is often implemented by applications that want to run in the background, for example, an Email application that wishes to check email in the background periodically. Often service modules have no UI associated with them and therefore no means to authenticate a user before acquiring the encryption-key from the Key management agent. The service may not be able to execute if the encryption key is unavailable. In this case, the service code is modified to wait for the key to be available before it begins execution. Once a key is available, the service may or may not expire the encryption key AndroidManifest.xml:

This file contains application definitions that are interpreted by the Android OS in order to execute the application. Some of the following modifications are may be made to the AndroidManifest.xml file:

Package Name: The Android platform expects that each application has a unique package name. The existing package name is modified, perhaps by prepending a unique string to ensure uniqueness of this application identifier. This allows another installation of the application to exist outside the secure zone.

Application Permissions: Applications have to declare the permissions they require to successfully run. New specific permissions may be defined for a variety of purposes, such as accessing relevant encryption-key(s) held by the Key management agent. We insert these new Key management agent related permissions into the AndroidManifest.

Activity Declaration: Each activity often defines attributes called intent-filters. These attributes tell the system whether an icon should be placed in a launcher, etc. In the Manifest file, these are nothing but strings declared with either the "action" tag or "category" tag. Similar to changing the package name, we may change the string values, perhaps by prepending a unique string. For example "android.intent.category.LAUNCHER" is might be changed to be "unique string.android.intent.category.LAUNCHER" to ensure that the Android system no longer recognizes this as a launchable application.

Secure Zone Isolation:

APIs between applications need to be isolated to ensure that only applications that have been modified to be in a secure zone are able to access APIs of other applications in the secure zone. Certain embodiments of the present invention accomplish this by utilizing the Android OS platform's ability to enforce API permissions based on the application signature. This is done by specifying that all APIs be only accessible by applications that are signed by the same authority. In this embodiment, all applications in the secure zone are signed with the same key.

Code Wrappers:

In addition to modifying methods based on purpose, we also may modify methods based on their behaviour. For instance, in order to encrypt File I/O, we may modify all methods which perform this I/O to use special Code wrappers instead.

The following are possible code wrappers:

Networking Wrappers: These wrapper methods are applied to all code that affects network activity. The wrappers can affect behavior such as:
  Enforce WiFi access policies: An example of a policy might be to enable network access only when connected to a corporate WiFi network.
  Enforce Network-type policies: An example of a policy might be to enable network access only when connected to a 3G network.
  Enforce VPN access: An example of a policy might be to enable network access only through a corporate VPN
  Automatic VPN: automatically reroute a designated application's network traffic through a VPN
  Enforce Application permissions: An example of a policy might be to enable network access only to specific applications.
  Enforce time of day policies: An example of a policy might be to enable network access only during designated date/times of day.
  Enforce network access parameters: An example of a policy might be to enable network access only to designated network resources such as IP addresses and ports.

File IO Wrappers: These wrapper methods are applied to all code that affects File operations. They can affect behavior such as
  Enforce application permissions: An example of a policy might be to enable file IO only for specific applications.
  Encrypt IO: An example of a policy might be to encrypt all data that is read/written to the file system
  File name modifications: Modify the file names as they are being created. This may be done to make the file irrecognizable.
  File data backup: Make a backup copy of all data that is being written by the application. This may even be done to a server on the network.

Database IO Wrappers: These wrapper methods are applied to all code that affects Database operations. They include:
  Encryption: Encryption is applied so that all records written to the database are accessible only with the encryption-key
  Enforce application permissions: An example of a policy might be to enable file IO only for specific applications.

Device Administration wrappers: These wrapper methods are applied to all code that affects administration. Examples include:
  Wipe: When servicing a request to wipe all data on the device, only delete data contained in the secure zone (SZ) instead of applying to the whole device.
  Policy enforcement: When servicing a request to enforce a specified policy, apply the policy only to the secure zone (SZ) instead of applying to the whole device.

Properly writing all of these wrappers manually may be difficult. For instance, in order to properly wrap all File I/O calls it is likely true that many other APIs which use file I/O will also have to be modified, and the application will likely have to be modified to use these modified APIs. As such, we may use a tool to automatically or semi-automatically generate such wrappers, perhaps by programmatically analyzing system libraries.

Automated and Semi-Automated Application Modifications

Certain embodiments of the present invention provide steps that can be automated in a variety of ways. These include during application development, during application deployment, during application execution or some combination thereof. Different degrees of automation might be used depending on the difficulty of the modification.

One example of the automated modification process involves taking an existing application binary, processing it in multiple steps and generating as output another application binary with all the modifications applied to it. The modifications may have to properly handle the APK file structure, perhaps by decompressing as the first step and recompressing as the final step. The modifications may also include software modifications, resource modifications, and other modifications.

Application Structure:

An android application is packaged in an 'apk' format. This apk format is similar to the zip format and can be disassembled using common tools on Windows, Mac or Linux host platforms. The application apk file has the following components:

File AndroidManifest.xml—This xml file describes the application to the Android system. It tells the system such things as what classes to load when the application is launched, what class to load when an application API is invoked by another app on the system and the permissions required by each application File classes.dex—This file contains the compiled version of the application code. The code is stored in Android specific bytecode format for the Dalvik virtual machine called Dalvik EXecutable (DEX).

File resources.arsc—This file contains an index table for all the resources in the application Folder res—This folder contains various resources required by the application Folder assets—This folder contains the assets required by the application Folder META-INF—This folder contains file which certify that prove that the application was signed by a certain authority.

Modification

The automated techniques for modifying files that perhaps include AndroidManifest.xml, classes.dex, and other files will likely follow a similar approach to that outlined in the "Application Modification" section.

Software Modification:

The software modification step works the classes.dex file. This executable format is designed to run on the Dalvik Virtual machine and contains in it references to methods provided by the system. Certain embodiments of the proposed invention modify the file possibly using the techniques mentioned in the "Application Modification" section.

Signature Modification:

Certain embodiments of the proposed invention require that all applications in the secure zone be signed by the same key. The automated techniques perform this resigning operation.

While certain embodiments and techniques involving the Android operating system are described in some detail above, similar techniques may be used in other embodiments and/or with respect to apps associated with other mobile operating systems.

Using techniques disclosed herein, a "secure zone" may be provided on a mobile device, e.g., by modifying apps installed in the secure zone to cause them to exhibit required behaviors, such as storing app content in encrypted form. In this way, restrictions may be enforced without (necessarily) requiring super user or other special permissions with respect to and/or access to the mobile device and/or operating system, and without the overhead and other shortcomings associated with virtualization based solutions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a secure partition, comprising:
receiving an indication that a first app is to be available to be used in a secure zone of a mobile device, wherein the indication comprises an attempt to install the first app to the secure zone, wherein the secure zone includes versions of one or more applications that exhibit a behavior associated with the secure zone;
determining that the first app is an unknown application and is not authorized to be installed in the secure zone; and
in response to the determination, modifying the first app to be an app that will not launch within the secure zone, wherein modifying the first app to be the app that will not launch within the secure zone includes changing a launcher component of the first app to be a launcher component that will not allow the app to launch; and
installing the modified first app, wherein the modified first app is a secure zone version of the first app.

2. The method of claim 1, wherein the secure zone version of the first app exhibits the behavior associated with the secure zone at least in part by invoking a replacement operating system component instead of a corresponding operating system component that the original version of the first app was configured to invoke.

3. The method of claim 1, wherein the secure zone version of the first app is generated at least in part by modifying or replacing one or more classes included in the first app.

4. The method of claim 3, wherein the secure zone version of the first app is generated at least in part by modifying one or more pointers included in the first app to point to said modified or replacement classes.

5. The method of claim 1, wherein the behavior associated with the secure zone includes storing app data in encrypted form.

6. The method of claim 1, wherein the behavior associated with the secure zone includes performing network communication via a virtual private network or other secure connection.

7. The method of claim 1, wherein the behavior associated with the secure zone includes storing cut or copied app data in a replacement clipboard component.

8. The method of claim 7, wherein the replacement clipboard component is configured to provide access to content only to the one or more applications associated with the secure zone.

9. The method of claim 1, further comprising receiving a password associated with the secure zone and allowing access to the one or more applications associated with the secure zone, without requiring reentry of the password when a user switches from using one of the one or more applications in the secure zone to using another of the one or more applications in the secure zone.

10. The method of claim 9, further comprising requiring password reentry if a no activity timer associated with the secure zone has expired.

11. The method of claim 1, wherein a secure zone version of an application of the one or more applications is configured to make app content available to one or more of the other applications associated with the secure zone at least in part by invoking an agent to back up the app content to a shared storage location.

12. The method of claim 11, wherein the one or more applications are configured to access the app content at least in part by invoking the agent to recover the app content from the shared storage location.

13. The method of claim 1, further comprising providing one or more replacement operating system components configured to hide one or more resources from the one or more applications associated with the secure zone.

14. The method of claim 13, wherein the one or more resources include one or more of the following: a set of contacts, an address book, a camera, a non-secure network connection, an unencrypted file.

15. The method of claim 1, wherein the secure zone version of the first app is generated at least in part by analyzing execution of the first app in a controlled test environment to observe one or more behaviors of the first app that are to be modified.

16. The method of claim 1, wherein the one or more applications executed in the secure zone store corresponding content data in a secure zone app data storage that is accessible to the plurality of apps in the secure zone.

17. The method of claim 1, wherein the secure zone version of the first app is generated at least in part by sending a request to a remote compliance server.

18. The method of claim 17, wherein the remote compliance server is configured to generate the secure zone version of the first app.

19. A system for providing a secure partition, comprising:
a processor configured to:

receive an indication that a first app is to be available to be used in a secure zone of a mobile device, wherein the indication comprises an attempt to install the first app to the secure zone;

determine that the first app is an unknown application and not authorized to be installed in the secure zone;

in response to the determination, modify the first app to be an app that will not launch within the secure zone, wherein to modify the first app to be the app that will not launch within the secure zone includes changing a launcher component of the first app to be a launcher component that will not allow the app to launch; and installing the modified first app; and a memory coupled to the processor and configured to provide the processor with instructions.

20. A computer program product to provide a secure partition, the computer program product being embodied in a tangible, non-transitory computer readable storage medium and comprising computer instructions for:

receiving an indication that a first app is to be available to be used in a secure zone of a mobile device, wherein the indication comprises an attempt to install the first app to the secure zone;

determining that the first app is unknown and not authorized to be installed in the secure zone;

in response to the determination modifying the first app to be an app that will not launch within the secure zone, wherein modifying the first app to be the app that will not launch within the secure zone includes changing a launcher component of the first app to be a launcher component that will not allow the app to launch; and installing the modified first app.

* * * * *